United States Patent [19]

Fiala

[11] 4,157,031
[45] Jun. 5, 1979

[54] APPARATUS FOR INDICATING THE FUEL CONSUMPTION RATE OF AN INTERNAL COMBUSTION ENGINE

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 920,497

[22] Filed: Jun. 29, 1978

[30] Foreign Application Priority Data

Jul. 13, 1978 [DE] Fed. Rep. of Germany ....... 2731568

[51] Int. Cl.² .................. G01L 3/26; G01M 15/00
[52] U.S. Cl. ........................................ 73/113
[58] Field of Search ........................ 73/113, 114

[56] References Cited

U.S. PATENT DOCUMENTS

| 3,084,539 | 4/1963 | Wentworth | 73/114 |
| 3,812,710 | 5/1974 | Bauman et al. | 73/114 |

FOREIGN PATENT DOCUMENTS 1017514  1/1966  United Kingdom ........... 73/114

Primary Examiner—Donald O. Woodiel
Attorney, Agent, or Firm—Brumbaugh, Graves, Donohue & Raymond

[57] ABSTRACT

A device for indicating the fuel consumption rate of an internal combustion engine. The device includes a potentiometer having a sliding contact engaging either a substantially linear resistor portion when the engine is operating under partial to full load, or a separate portion when the engine is operated in the idling mode or the deceleration mode. The sliding contact is connected with the engine throttle for adjusting the position of the sliding contact in accordance with the amount of fuel supplied to the engine. A voltage source is connected to the linear portion of the potentiometer, and to the separate portion, with a switching means interposed in the latter case for selectively supplying different voltages to the separate portion depending upon whether the engine is in the idling mode or deceleration mode, for indicating a higher or lower fuel consumption rate, respectively, on a fuel consumption rate indicator electrically connected to the sliding contact.

5 Claims, 1 Drawing Figure

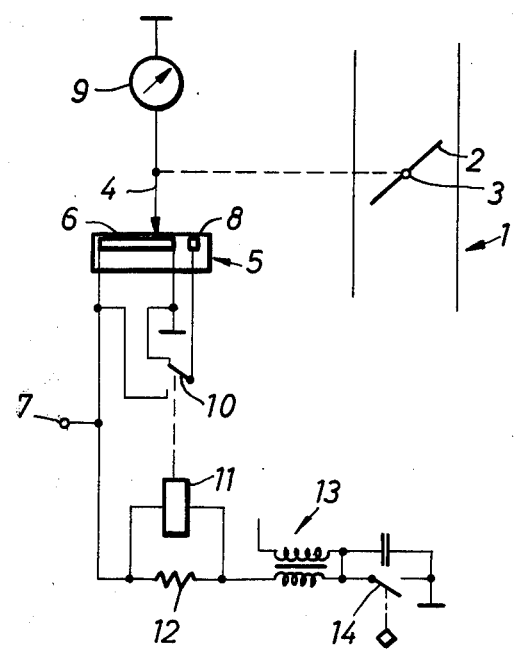

APPARATUS FOR INDICATING THE FUEL CONSUMPTION RATE OF AN INTERNAL COMBUSTION ENGINE

BACKGROUND OF THE INVENTION

This invention is a device for indicating the fuel consumption rate of an internal combustion engine with a potentiometer having a sliding contact mechanically connected to the fuel proportioning means of the engine and electrically to a fuel consumption indicator.

Devices of this type are known in the art. For example, German public disclosure (DOS) No. 24 40 398, G01F, 9/00 discloses a device for indicating the fuel consumption rate of an engine having a fuel injection device wherein the sliding contact of a potentiometer is mechanically linked to the injection pump control rod of a fuel injection apparatus of the engine. This device, which also includes a resistor whose resistance varies as a function of the engine speed, may also be used with an engine having a carburetor, in which case the sliding contact of the potentiometer would be linked mechanically to the throttle valve in the intake manifold, or as disclosed in German public disclosure (DOS) No. 23 57 770, G01F, 29/02, to the gas pedal.

SUMMARY OF THE INVENTION

The present invention is a device for indicating the fuel consumption rate of an internal combustion engine utilizing a minimum of electrical and/or electronic components and providing at least a qualitative indication of the instantaneous fuel consumption rate of the engine for all relevant operating modes of the engine. The indicator may be an instrument gauge or any other device furnishing an acoustic or optical signal at least when certain fuel consumption rates occur.

More particularly, the device includes a potentiometer having a sliding contact engaging a resistor arrangement having a substantially linear resistor portion, which is engaged by the contact when the engine is operating under partial to full load, and a separate portion engaged by the contact when the engine is operating in the idling mode or the deceleration mode. The sliding contact is connected with the fuel proportioning device of the engine, such as the throttle, for adjusting the position of the contact in accordance with the amount of fuel supplied to the engine. There is also a voltage source connected to the linear portion and to the separate portion, with a switching arrangement interposed between the voltage source and the separate portion for selectively supplying different voltages to the separate portion depending upon whether the engine is in the idling mode or the deceleration mode, for indicating a higher or lower fuel consumption rate, respectively. The indicator gauge is electrically connected to the sliding contact.

This device, therefore, is designed to indicate a different fuel consumption rate for the same position of the throttle valve, depending upon whether the engine is idling, or decelerating.

This is accomplished by providing a potentiometer as described above having a substantially linear resistance portion and a separate portion. The sliding contact will engage the separate portion any time the throttle is substantially closed, that is, either when the engine is idling or is in the decelerating mode. A different voltage will be supplied to the separate portion, however, and thus to the sliding contact and fuel rate indicator, depending upon the engine speed, which will be indicative of the operating mode of the engine. Preferably, the switching apparatus is connected to a relay, with the voltage supplied to the relay dependent upon engine speed, and the relay set to open at a predetermined appropriate voltage level. In place of such arrangement, however, it would also be possible to provide a potentiometer with two sliding contacts, or two potentiometers, each with one sliding contact, and switch the indicator according to engine speed from one contact to the other dependent upon whether the engine is operating under partial to full load or in the deceleration mode on the one hand, or in the idling mode.

The speed signal may be obtained in voltage form from an ignition circuit of the engine, if the engine is spark ignited. See U.S. Pat. No. 3,559,063 and 3,588,698, G01t, 3/48, or U.S. Pat. No. 3,891,925, G01G, 3/12. In one arrangement, the voltage is obtained from an auxiliary resistor in series with the breaker contact (ignition "points"). In this arrangement, the voltage on the resistor will decrease with increasing engine speed. Given a constant closing angle (dwell) and constant supply voltage of the ignition circuit, there will be a comparatively linear relationship between voltage and engine speed. With a variation of the closing angle of the contact breaker and/or the supply voltage of the ignition current, this curve will shift. With the closing angle and supply voltage kept constant, the voltage on the resistor provides a good indication of the prevailing speed of the engine, and can be used for analog indication, preferably by means of a moving coil instrument (gauge).

BRIEF DESCRIPTION OF THE DRAWINGS

For a better understanding of the invention, reference is made to the following detailed description of a preferred embodiment and accompanying FIGURE, which is a schematic circuit diagram of an embodiment of the device according to the invention.

DETAILED DESCRIPTION OF A PREFERRED EMBODIMENT

Referring to the drawing, 1 represents the intake passage of the engine, having a conventional throttle 2 whose shaft 3 is mechanically linked to both a gas pedal (not shown) and to the sliding contact 4 of a potentiometer 5. Under partial to full load, the throttle 2 is swung into a more or less open position; in the idling mode of the engine, the throttle 2 is substantially closed. The mechanical linkage between the throttle shaft 3 and the sliding contact 4 of the potentiometer 5 is arranged so that when the throttle 2 is wide open, the contact 4, as shown in the FIGURE, will be toward the left end of a substantially linear resistor portion 6 of the potentiometer 5. This resistor portion 6 is connected at one end to the terminal 7 of a voltage source, generally the vehicle battery, and at its other end to ground. As the throttle 2 is closed, the sliding contact 4 moves towards the right-hand end of the resistor portion 6, increasing the resistance across the potentiometer 5 to the sliding contact 4. When the engine is in the idling mode, and the throttle 2 closed, the sliding contact 4 will engage a separate portion 8 of the potentiometer 5. A large enough distance is provided between the substantially linear portion 6 and separate portion 8 to avoid short circuiting by the sliding contact 4.

At such times when the sliding contact is positioned to engage the linear resistor portion 6 of the potentiometer 5, the indicator gauge 9, which may be a voltmeter, is supplied with a voltage that varies at least fairly linearly with the throttle setting. When the throttle 2 is in the idling position, and the sliding contact thus engages the separate portion 8, the voltage supplied to the voltmeter depends upon whether the engine is operating in the idling mode or in the deceleration mode. This voltage is controlled by the position of a contact switch 10, connected to a relay 11 operable in response to the speed of the engine. When the engine is operating in the deceleration mode, which characteristically will mean engine speeds higher than idling, the switch 10 will be in the position shown in the FIGURE, connecting the separate portions 8 to the grounded side of the resistor portion 6 and thus providing a very low voltage to the voltmeter 9 to indicate a low fuel consumption rate. When the engine is in the idling mode, however, the relay 11 will close, moving the contact switch 10 into its second position, wherein a very high voltage from the voltage source 7 is provided to the separate portion, and thus the voltmeter will indicate a high fuel consumption rate.

The position of the contact switch 10 is determined by a signal representing the instantaneous engine speed. The signal used in the preferred embodiment is the voltage across an auxiliary resistor 12 of the ignition circuit 13 having a contact breaker 14 which is of a known type and therefore not described in further detail. The voltage on the resistor 12 declines, as described above, with increasing speed so that the voltage across the resistor 12 required for relay 11 to close is reached only at idling speed.

Thus, the invention provides a device delivering an instantaneous fuel consumption rate indication tailored to the requirements of practical operation in all modes, to a large extent utilizing features of the engine that are present in any case.

The aforementioned description represents a preferred embodiment of the device according to the invention. Various modifications will be apparent to those skilled in the art, and all such modifications and variations are intended to be within the scope of the invention, as defined in the following claims.

I claim:

1. A device for indicating the fuel consumption rate of an internal combustion engine comprising:
    (a) potentiometer means having a sliding contact engaging resistance means, said resistance means having a substantially linear portion engaged by said contact when the engine is operating under partial to full load and a separate portion engaged by said contact when the engine is operating in the idling mode or the deceleration mode;
    (b) means connecting said sliding contact with the fuel proportioning means of the engine for adjusting the position of said contact in accordance with the amount of fuel supplied to the engine;
    (c) indicator means electrically connected to said sliding contact;
    (d) a voltage source connected to said linear portion, and
    (e) means operable in response to engine speed connected between said voltage source and said separate portion for selectively supplying different voltages to said separate portion, depending upon whether said engine is in the idling mode or the deceleration mode, for indicating a higher or lower fuel consumption rate, respectively.

2. A device according to claim 1, wherein said means operable in response to engine speed comprises a relay switch with a defined switching threshold, said relay switch having a switching contact for selectively connecting said separate portion to different voltages, and having an excitation winding connected to receive an engine speed-dependent signal.

3. A device according to claim 2, wherein said switching contact in a first position connects said separate portion to a source of constant voltage and in a second position connects said separate portion to ground.

4. A device according to claim 2 or 3, wherein said engine speed-dependent signal is a voltage obtained from the ignition circuit of the engine.

5. A device according to claim 4 for use in an internal combustion engine having an ignition circuit with a resistor in series with a breaker contact, wherein said speed-dependent signal is the voltage across said resistor.

* * * * *